(12) United States Patent
Gilabert Oriol et al.

(10) Patent No.: US 11,377,379 B2
(45) Date of Patent: Jul. 5, 2022

(54) WATER TREATMENT

(71) Applicant: DDP SPECIALTY ELECTRONIC MATERIALS US, INC., Collegeville, PA (US)

(72) Inventors: Guillem Gilabert Oriol, Tarragona (ES); Marcus J. Slagt, Hoek (NL); Gerard Massons, Tarragona (ES)

(73) Assignee: DDP SPECIALTY ELECTRONIC MATERIALS US, INC.

( * ) Notice: Subject to any disclaimer, the term of this patent is extended or adjusted under 35 U.S.C. 154(b) by 0 days.

(21) Appl. No.: 17/050,684

(22) PCT Filed: Apr. 12, 2019

(86) PCT No.: PCT/US2019/027216
§ 371 (c)(1),
(2) Date: Oct. 26, 2020

(87) PCT Pub. No.: WO2019/212720
PCT Pub. Date: Nov. 7, 2019

(65) Prior Publication Data
US 2021/0238072 A1    Aug. 5, 2021

(30) Foreign Application Priority Data
May 1, 2018    (EP) ..................................... 18382302

(51) Int. Cl.
*C02F 3/06* (2006.01)
*C02F 1/44* (2006.01)
(Continued)

(52) U.S. Cl.
CPC ................ *C02F 3/06* (2013.01); *C02F 1/441* (2013.01); *C02F 3/108* (2013.01); *C02F 3/109* (2013.01);
(Continued)

(58) Field of Classification Search
CPC .. C02F 3/06; C02F 1/441; C02F 3/108; C02F 3/109; C02F 2003/001; C02F 2201/002;
(Continued)

(56) References Cited

U.S. PATENT DOCUMENTS 5,228,998 A * 7/1993 DiClemente ........ B01F 13/0049
210/610
5,458,788 A * 10/1995 Tang .................... B01D 24/008
210/744

(Continued)

OTHER PUBLICATIONS

PCT International Search Report, dated May 22, 2019, for International Application No. PCT/US2019/027216, filed Apr. 12, 2019; ISA EPO; Authorized officer Carina Bergstrom.

*Primary Examiner* — Nam X Nguyen
*Assistant Examiner* — Ekandra S. Miller-Cruz
(74) *Attorney, Agent, or Firm* — Edward W. Black; Kenneth Crimaldi

(57) ABSTRACT

Provided is a method of treating feed water comprising the step of passing the feed water through a biostratum that comprises resin beads and living microorganisms to produce biostratum-treated water, wherein
  (a) the area-normalized free void volume in the biostratum is 0.018 m³/m² or less;
  (b) the packing density in the biostratum is 0.68 to 0.96;
  (c) the ratio of the exterior surface area of the resin beads to the total free void volume in the biostratum is less than 2.0 to 50 m²/L;
  (d) the velocity of the water through the biostratum is 1 to 1,500 biostratum volumes per hour; and
  (e) the Reynolds number of the flow through the biostratum is 0.10 to 3.0.

5 Claims, 3 Drawing Sheets

Figure 1:
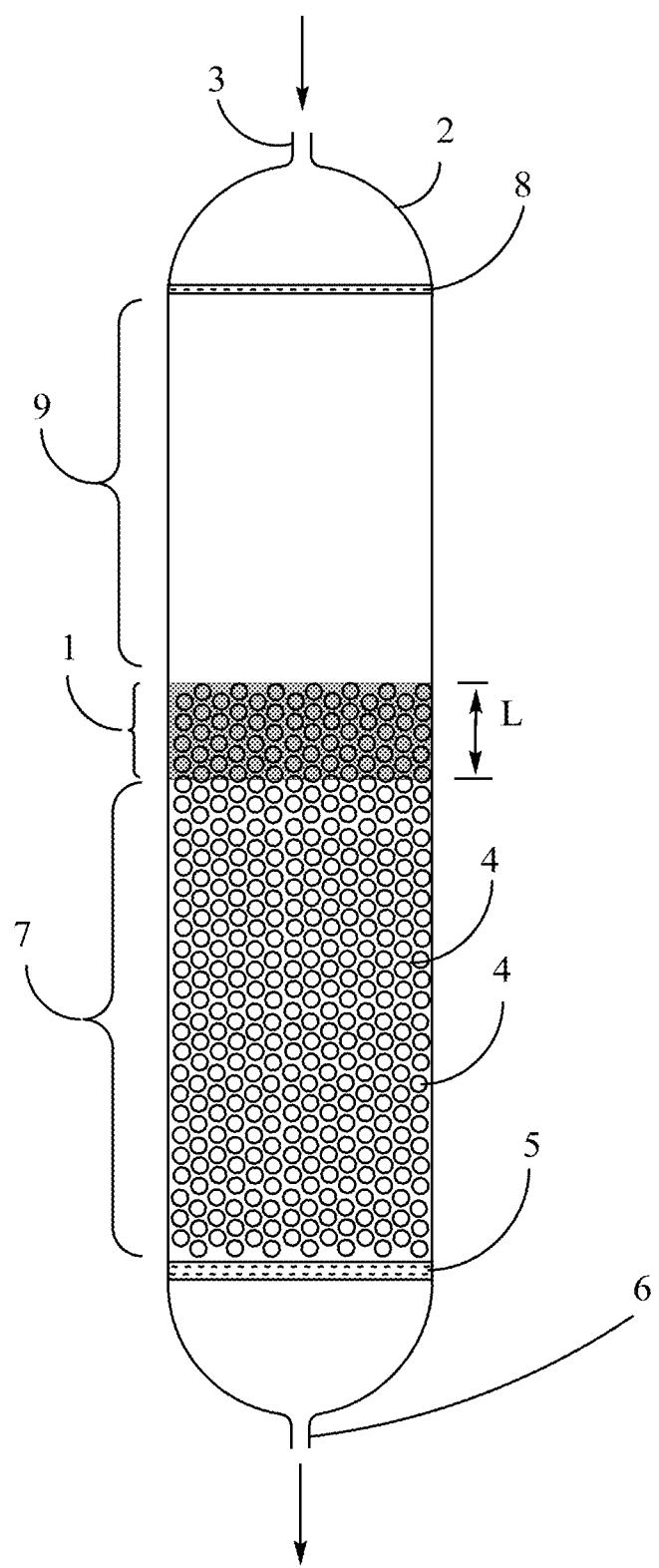

(51) Int. Cl.
*C02F 3/10* (2006.01)
*C02F 3/00* (2006.01)

(52) U.S. Cl.
CPC .. *C02F 2003/001* (2013.01); *C02F 2201/002* (2013.01); *C02F 2301/022* (2013.01); *C02F 2303/20* (2013.01); *C02F 2305/06* (2013.01)

(58) Field of Classification Search
CPC ............ C02F 2301/022; C02F 2303/20; C02F 2305/06; C02F 1/42; C02F 1/442; C02F 1/444; C02F 2301/04; C02F 2301/02; C02F 3/2846; Y02W 10/10
USPC ........... 210/311, 792, 793, 108, 167.14, 275, 210/333.01, 333.1, 393, 425, 427, 772, 210/617
See application file for complete search history.

(56) References Cited

U.S. PATENT DOCUMENTS

| | | | | |
|---|---|---|---|---|
| 5,681,471 | A * | 10/1997 | Silverstein | C02F 3/2806 210/614 |
| 5,747,311 | A * | 5/1998 | Jewell | C02F 3/087 435/176 |
| 5,908,555 | A | 6/1999 | Reinsel et al. | |
| 6,037,445 | A * | 3/2000 | Dankworth | B01J 19/242 525/331.7 |
| 6,241,889 | B1 * | 6/2001 | Haley, III | C02F 3/04 210/615 |
| 6,383,373 | B1 * | 5/2002 | Nakao | C02F 3/10 210/151 |
| 6,797,171 | B2 * | 9/2004 | Bartlett | B09C 1/10 210/610 |
| 7,288,197 | B2 * | 10/2007 | Shao | C02F 3/085 210/615 |
| 8,883,012 | B2 | 11/2014 | Boodoo et al. | |
| 9,718,004 | B2 * | 8/2017 | Fujita | B01D 39/083 |

* cited by examiner

WATER TREATMENT

It is often desired to remove impurities from water by passing the impure water through a purification process such as a reverse osmosis treatment or nanofiltration. One common difficulty with such purification processes is biofouling, a phenomenon in which bacteria grow on the apparatus. Biofouling is undesirable. For example, if the purification process involves passing water through a membrane, biofouling causes the growth of a biofilm on the membrane, which reduces the membrane permeability, possibly generating a larger than desirable pressure drop across the membrane, which could also eventually mechanically compromise the membrane element integrity due to the higher pressure drop across the membrane.

U.S. Pat. No. 8,883,012 describes a method in which water is passed through a vessel containing a resin component and then feeding the water to a reverse osmosis membrane. It is desired to provide an improved method of pretreating impure water in which the water passes through a bed of resin beads in which microorganisms grow. It is desired that the improved pretreatment method has one or more of the following benefits: (1) when pretreated water is passed through a reverse osmosis treatment, there is a reduced incidence of biofouling of the reverse osmosis membrane; and (2) microorganism growth that occurs on the resin beads used for pretreatment is relatively easily removed by backwashing.

The following is a statement of the invention.

A first aspect of the present invention is a method of treating feed water comprising the step of passing the feed water through a biostratum that comprises resin beads and living microorganisms to produce biostratum-treated water, wherein
  (a) the area-normalized free void volume in the biostratum is 0.018 m$^3$/m$^2$ or less;
  (b) the packing density in the biostratum is 0.68 to 0.98;
  (c) the ratio of the exterior surface area of the resin beads to the total free void volume in the biostratum is less than 2.0 to 50 m$^2$/L;
  (d) the velocity of the water through the biostratum is 1 to 1,500 biostratum volumes per hour; and
  (e) the Reynolds number of the flow through the biostratum is 0.10 to 3.0.

The following is a brief description of the drawing.

Figure 2:
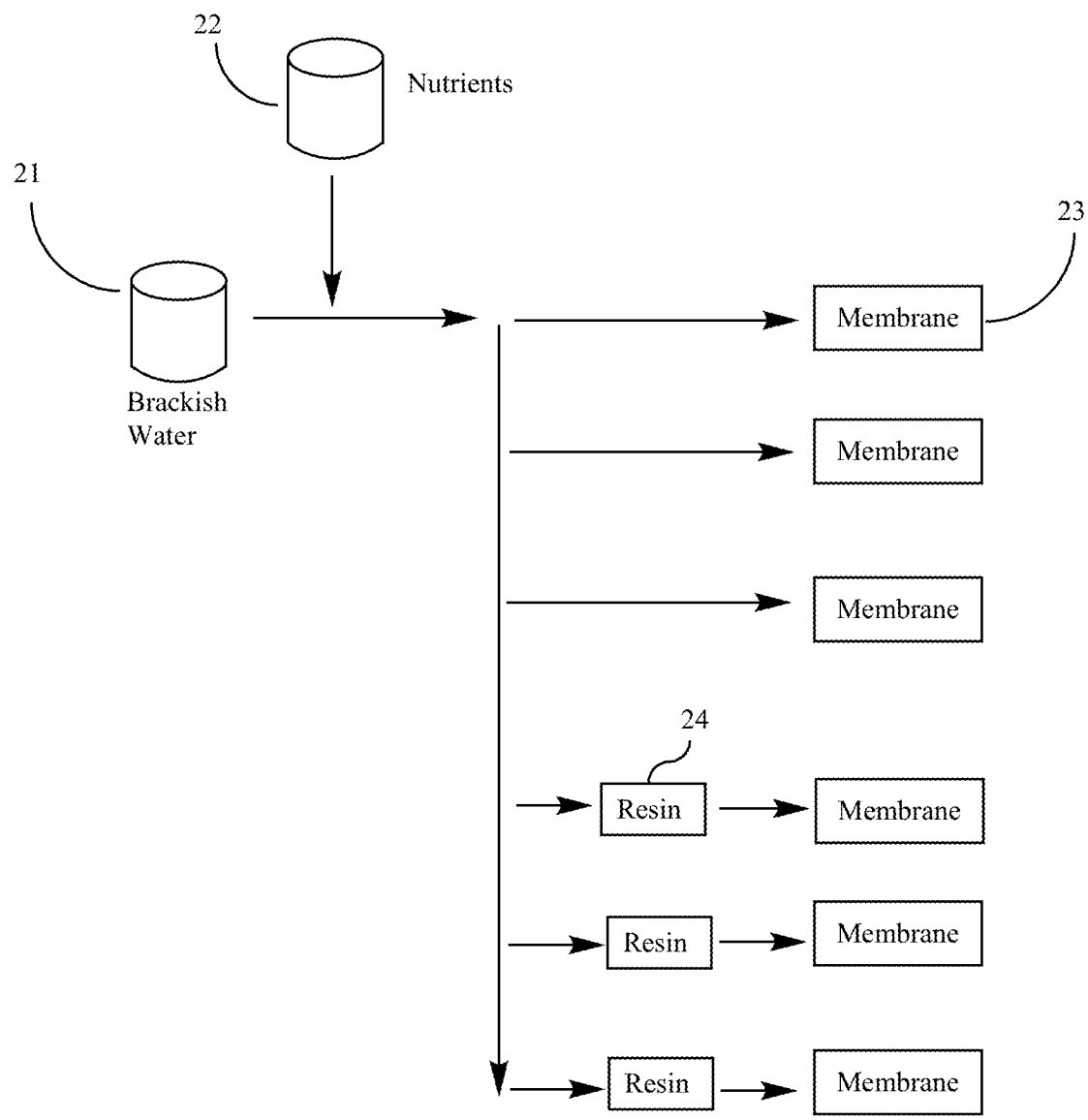
Figure 3:
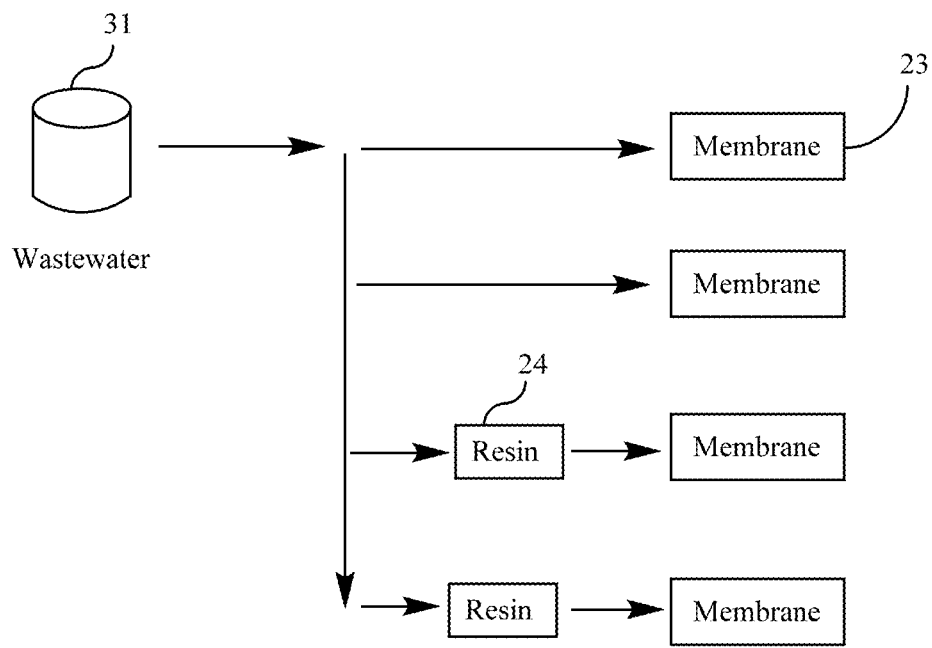

FIG. 1 shows an embodiment of the present invention.
FIG. 2 shows "Setup 1" used in the Examples.
FIG. 3 shows "Setup 2" used in the Examples.

The following is a detailed description of the invention.

As used herein, the following terms have the designated definitions, unless the context clearly indicates otherwise.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weights of 2,000 or more.

Molecules that can react with each other to form the repeat units of a polymer are known herein as "monomers." The repeat units so formed are known herein as "polymerized units" of the monomer.

Vinyl monomers have a non-aromatic carbon-carbon double bond that is capable of participating in a free-radical polymerization process. Vinyl monomers have molecular weights of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. "Substituted" means having at least one attached chemical group such as, for example, alkyl group, alkenyl group, vinyl group, hydroxyl group, alkoxy group, hydroxyalkyl group, carboxylic acid group, sulfonic acid group, amino group, quaternary ammonium group, other functional groups, and combinations thereof.

Monofunctional vinyl monomers have exactly one polymerizable carbon-carbon double bond per molecule. Multifunctional vinyl monomers have two or more polymerizable carbon-carbon double bonds per molecule.

The category "acrylic monomers" is the group of monomers selected from acrylic acid; methacrylic acid; substituted or unsubstituted alkyl esters of acrylic acid or methacrylic acid; and acrylonitrile.

As used herein, vinyl aromatic monomers are vinyl monomers that contain one or more aromatic ring.

Vinyl monomers are considered to form polymers through a process of vinyl polymerization, in which the carbon-carbon double bonds react with each other to form a polymer chain.

A polymer in which 90% or more of the polymerized units, by weight based on the weight of the polymer, are polymerized units of one or more vinyl monomers is a vinyl polymer. A vinyl aromatic polymer is a polymer in which 50% or more of the polymerized units, by weight based on the weight of the polymer, are polymerized units of one or more vinyl aromatic monomer.

A resin is considered herein to be crosslinked if the polymer chain has sufficient branch points to render the polymer not soluble in any solvent. When it is said herein that a polymer is not soluble in a solvent, it means that less than 0.1 gram of the resin will dissolve in 100 grams of the solvent at 25° C.

The degree to which a particle is spherical is characterized by the sphericity $\Psi$, which is defined using of the three principal orthogonal axes of the object, a (longest), b (intermediate), and c (shortest), as follows: $\Psi = c/a$.

The term "beads" herein refers to discrete particles that are solid over a temperature range that includes the range 15° C. to 40° C.

A collection of resin beads may be characterized by the diameters of the beads. A particle that is not spherical is considered to have a diameter equal to the diameter of a sphere having the same volume as the particle. The harmonic mean diameter (HMD) is defined by the following equation:

$$HMD = \frac{N}{\sum_{i=1}^{N} \left( \frac{1}{d_i} \right)}$$

where i is an index over the individual beads; $d_i$ is the diameter of each individual particle; and N is the total number of beads.

Microorganisms are single-celled organisms, some of which exist as individual cells or as a colony of cells.

Included are bacteria, protozoa, and archaea. Some fungi, and algae are microorganisms.

Ratios presented herein are characterized as follows. For example, if a ratio is said to be 3:1 or greater, that ratio may be 3:1 or 5:1 or 100:1 but may not be 2:1. This characterization may be stated in general terms as follows. When a ratio is said herein to be X:1 or greater, it is meant that the ratio is Y:1, where Y is greater than or equal to X. For another example, if a ratio is said to be 15:1 or less, that ratio may be 15:1 or 10:1 or 0.1:1 but may not be 20:1. In general terms, when a ratio is said herein to be W:1 or less, it is meant that the ratio is Z:1, where Z is less than or equal to W.

The present invention involves the use of a biostratum. A biostratum contains resin beads and microorganisms. A biostratum forms when impure feed water flows through a bed of resin beads that are contained in a vessel. The microorganisms grow in a layer of the resin beads that is closest to the inlet into the vessel. The microorganisms create a biomass that contains both the cells of the microorganisms and extracellular polymeric substances (EPS) created by the microorganisms. The proportion of EPS in the biomass varies. In a typical biomass EPS may be 75% or more of the biomass by volume, or 85% or more; or 95% or more. The existence of the biostratum may be detected in a variety of ways. In many embodiments, the bed of resin beads is held in a transparent vessel, for example a vessel made of glass or transparent polyvinyl chloride. Then the region where biostratum is growing can be detected visually as a region in which opaque white material is visible between the resin beads. The invention may be practiced in any type of vessel, but transparency can aid in verifying the existence of the biostratum, and it can then be reasonably deduced that biostratum also exists in a non-transparent vessel operating under similar conditions. Also, an opaque vessel may optionally be equipped with a transparent window that allows visual observation of the biostratum. Suitable vessel materials are glass, plastic, steel, or other materials.

The existence of microorganisms in the biostratum may be verified in other ways. For example, a sample of the biostratum may be taken and examined in an optical microscope. Material characteristic of microorganisms and the resulting EPS in the interstices between the resin beads will be visible in the optical microscope. Microorganism growth may be monitored by analyzing for the presence of adenosine triphosphate; by culturing material from the suspected biostratum and counting colonies; by analyzing for total organic carbon (TOC); by analyzing for nitrogen; by analyzing for carbohydrates and/or proteins. Also, the pressure drop of the feed water passing through the vessel may be monitored. As microorganisms grow, the pressure drop becomes larger. It is contemplated that during normal operation of the method of the present invention, formation of the biostratum would be monitored by measuring the pressure drop.

Growth of microorganisms begins in between the resin beads in the region nearest the inlet to the vessel. As growth of microorganisms continues, the microorganisms are present in a layer that contains resin beads and the microorganisms; this layer is known herein as the biostratum. As growth of the microorganisms continues, the thickness of the biostratum, as measured in the net direction of water flow, also continues to grow.

The present invention involves the treatment of impure water, referred to herein as "feed water." In preferred embodiments, feed water enters the vessel, passes through the biostratum, then, in the same vessel, passes through a collection of resin beads (known herein as the "bead stratum") that has little or no microorganism growing. The amount of microorganism may be characterized as the weight of microorganism per cubic centimeter. Preferably the ratio of the average amount of microorganism in the bead stratum to the average amount of microorganism in the biostratum is 0.1:1 or less; more preferably 0.03:1 or less; more preferably 0.01:1 or less. Preferably, the resin beads in the bead stratum are identical to the resin beads in the biostratum.

The resin beads of the present invention comprise one or more polymers. The polymer comprises aromatic rings. Preferred polymers are vinyl polymers; more preferred are vinyl aromatic polymers. Preferably, the total weight of polymerized units of all vinyl aromatic monomers is, by weight of the polymer, 50% or more; more preferably 75% or more; more preferably 90% or more; more preferably 95% or more.

Preferred vinyl aromatic monomers are styrene, alkyl styrenes, and multifunctional vinyl aromatic monomers. Among alkyl styrenes, preferred are those in which the alkyl group has 1 to 4 carbon atoms; more preferred is ethylvinylbenzene. Among multifunctional vinyl aromatic monomers, preferred is divinylbenzene. Preferably the polymer contains polymerized units of multifunctional vinyl aromatic monomer in as amount, by weight based on the weight of polymer, of 0.5% or more; more preferably 1% or more. Preferably the polymer contains polymerized units of multifunctional vinyl aromatic monomer in as amount, by weight based on the weight of polymer, of 10% or less; more preferably 8% or less.

It is useful to characterize the intrinsic properties of the resin beads. That is, it is useful to characterize the properties that the resin beads have before they are put to use in the process of the present invention. Preferably, the polymer in the resin beads is crosslinked. Resin beads are either macroporous resin beads or gel resin beads. Macroporous resin beads have pores with average diameter larger than 10 nm. Gel resin beads have porosity that is formed only by the void volumes that normally form between entangled polymer chains. Gel resin beads have average pore size of 10 nm or smaller. Preferably, the resin beads are gel resin beads.

Another intrinsic property of the resin beads is the bead density, which is the specific gravity of an individual bead. Preferably the resin beads have bead density of 1.10 or greater; more preferably 1.15 or greater; more preferably 1.18 or greater; more preferably 1.20 or greater.

An intrinsic property of the resin beads is the diameter. Preferably the collection of resin beads has harmonic mean diameter of 200 micrometers or larger; more preferably 300 micrometers or larger; more preferably 400 micrometers or larger. Preferably the collection of resin beads has harmonic mean diameter of 2,000 micrometers or smaller; more preferably 1,500 micrometers or smaller; more preferably 1,000 micrometers or smaller. Preferably the resin beads have number-average sphericity of 0.85 or higher; more preferably 0.90 or higher; more preferably 0.95 or higher; more preferably 0.98 or higher.

An intrinsic property of the resin beads is the presence or absence of functional groups covalently bound to the resin. Resin beads are optionally functionalized. That is, the resin beads may have one or more chemical functional group covalently attached to the polymer. For example, the functional group may be an amine group, a chelating group, a carboxylic acid group, a sulfonic acid group, or an ionic version thereof. Resin beads are optionally useful as ion exchangers. For example, resin beads having amine groups may be useful as anion exchange resin beads.

An intrinsic property of the resin beads is whether or not the resin beads contain particles of hydrated ferric oxide (HFO), which may be located inside the resin beads or on the surface of the resin beads. Preferred resin beads contain particles of HFO. The HFO particles preferably have average diameter of less than 500 nm. Preferably the amount of HFO, by weight based on the total weight of the resin beads, including the HFO, is 5% or more; more preferably 10% or more. Preferably the amount of HFO, by weight based on the weight of the resin beads (including the HFO) is 40% or less; more preferably 30% or less.

The "length" of a stratum is considered to be the dimension of the stratum in the direction of net flow of the water.

L=length of the biostratum
LB=length of the bead stratum

Preferably, the ratio of LB:L is 1:1 or greater; more preferably 2:1 or greater; more preferably 5:1 or greater; more preferably 10:1 or greater. Preferably, L is 20 cm or less; more preferably 10 cm or less; more preferably 5 cm or less.

The cross section of the vessel is the section taken perpendicular to the direction of net flow of water through the vessel. Preferably, the portion of the vessel where resin beads are present has a uniform cross section. Preferably, the cross section is circular.

Feed water passes through the biostratum and is then labeled herein as "biostratum-treated" water.

Various characteristics of the biostratum are determined as follows. Units are shown in parentheses.

Dp=diameter of a single bead=HMD of the collection of beads (m)

Vb=volume of a single bead=$(4/3)(pi)(D_p/2)^3$ (cubic meter, or m$^3$);

Sb=surface area of a single bead=$4(pi)(D_p/2)^2$ (square meter, or m$^2$);

NPCM=number of beads per cubic meter=$\varepsilon$/Vb (m$^{-3}$);

Av=area of the cross section of the interior volume of the vessel (m$^2$)

As=area of the cross section of the biostratum=Av in the biostratum (m$^2$);

Vs=volume of the biostratum=Av*L (m$^3$);

SBV=volume of the biostratum occupied by beads=Vs*Vb*NPCM (m$^3$);

Stot=The total surface area of the beads in the biostratum=NPCM*Vs*Sb (m$^2$);

FVV=The free void volume in the biostratum=Vs−SBV (m$^3$);

The biostratum may be characterized by the total free void volume. It is useful to normalize the total free void volume by dividing by the area of the cross section of the biostratum, to obtain the area-normalized free void volume (ANFVV) as follows:

$$ANFVV=FVV/As \text{ (m}^3/\text{m}^2).$$

The area-normalized free void volume (ANFVV) is less than or equal to 0.018 m$^3$/m$^2$; preferably less than or equal to 0.015 m$^3$/m$^2$. ANFVV is preferably greater than or equal to 0.001 m$^3$/m$^2$; more preferably greater than or equal to 0.002 m$^3$/m$^2$.

The biostratum may be characterized by the packing density (PD), which is defined by the equation PD=1−$\varepsilon$, where the void fraction c is a measured quantity and is measured at 25° C. by flowing water through the biostratum and measuring the pressure drop in the water from the inlet to the outlet of the biostratum. The packing density c is then found by using computer modeling to solve the well-known Carman-Kozeny equation as follows:

$$\frac{dP}{L} = \frac{150\mu}{\Psi^2 D_p^2} \frac{(1-\varepsilon)^2}{\varepsilon^3} v$$

where dP is the pressure drop across the biostratum (bar); L is the thickness of the biostratum (meters); $\mu$ is the viscosity of water at 25° C. (0.000897 Pa*s); v is the velocity of the water (meter/s), Dp, as defined above, is the diameter of a single bead, and $\Psi$ is the sphericity of the bead, assumed here to be $\Psi$=1.

Measurement of dP/L may be made as follows. L is the length of the biostratum, which may be observed as described above and measured directly. To measure dP, one method is to measure the pressure drop ($\Delta$Pi) across the entire vessel containing resin beads, prior to any growth of microorganisms, at a specific velocity v of water passing through the vessel. Then, after growth of microorganisms has taken place, the pressure drop ($\Delta$P1) is measured across the entire vessel while water is passing through at the same velocity v. Then dP=$\Delta$P1−$\Delta$Pi.

The packing density ($\varepsilon$) is 0.68 or higher; preferably 0.70 or higher; more preferably 0.74 or higher. The packing density ($\varepsilon$) is 0.98 or lower; preferably 0.96 or lower; more preferably 0.95 or lower; more preferably 0.94 or lower.

Another characteristic of the biostratum is the ratio ("RSV") of the exterior surface area of the resin beads to the total free void volume:

$$RSV=Stot/FVV$$

RSV is 2 m$^2$/L or higher; preferably 5 m$^2$/L or higher; more preferably 10 m$^2$/L or higher. RSV is 50 m$^2$/L or lower; preferably 40 m$^2$/L or lower; more preferably 30 m$^2$/L or lower. RSV is first calculated using quantities having all the units listed above for the individual quantities, resulting in RSV in units of m$^2$/m$^3$, which is then converted to m$^2$/L for convenience.

A characteristic of the method of the present invention is the flow rate (FR) of feed water through the biostratum. This flow rate is characterized as biostratum volumes per hour (Vs/h). The flow rate is 1 Vs/h or higher; preferably 10 Vs/h or higher; more preferably 30 Vs/h or higher; more preferably 100 Vs/h or higher; preferably 120 Vs/h or higher. The flow rate is 1,500 Vs/h or lower; preferably 1,000 Vs/H or lower; more preferably 750 Vs/h or lower.

Another characteristic of the method of the present invention is the Reynolds number (Re) of the flow through the biostratum. The FVVL is determined using the following parameters:

TVS=total void surface area=As*(1−$\varepsilon$) (m$^2$);
FR=volumetric flow rate=(flow rate in Vs/h) (m$^3$/h);
FVVL=free void velocity=FR/TVS (m/h)
$\rho$=density of water at 25° C.=998.2 kg/m$^3$
$\mu$=viscosity of water at 25° C.=0.000897 Pa*s
Dv=[(0.1547)*Dp]=[diameter of a theoretical circle that fits into the interstitial area bounded by three close-packed circles of diameter Dp in a plane] (m)

Then the Reynolds number (Re) is determined as follows:

$$Re=FVVL*Dv*\rho/\mu$$

The Reynolds number is 0.10 or higher; preferably 0.20 or higher; more preferably 0.30 or higher. The Reynolds number is 3.0 or lower; more preferably 2.0 or lower; more preferably 1.5 or lower; more preferably 1.1 or lower.

After the biostratum-treated water departs from the biostratum, it preferably immediately enters a bead stratum in the same vessel. After the water passes through the bead stratum, it is labeled herein as "bead-treated" water.

A preferred embodiment of the present invention is shown in FIG. 1. FIG. 1 shows a vertical cross section of a vessel 2 that contains resin beads 4. The horizontal cross section of the vessel is circular. Water enters the vessel 2 through inlet 4, then passes through the biostratum 1, becoming biostratum-treated water. The biostratum-treated water then passes through bead stratum 7, becoming bead-treated water. Resin beads 4 are present in both the bead stratum 7 and the biostratum 1. The resin beads are retained in the vessel by a barrier 5 that allows the passage of water but holds the resin beads 4 in place. Bead-treated water leaves the vessel 2 through an outlet 6. Also shown in FIG. 1, is the length (L) of the biostratum. Also shown is a barrier 8 that allows the passage of water but holds the beads 4 in place. During a backwash, barrier 8 allows passage of the backwash solution as well as passage of microorganisms, EPS, and any other materials other than resin beads that had been in the biostratum. The freeboard 9 is provided to facilitate backwashing.

After the method of the present invention has been performed for a time, it is expected that the biostratum will have grown undesirably large. Preferably, from time to time, a backwashing process is performed to remove microorganisms and EPS from the resin beads. A backwashing process includes a process in which a backwash solution (either water or an appropriate aqueous solution) is forced under pressure into the vessel through the outlet. The backwash solution passes through vessel in "upflow," the direction opposite to the direction taken by the feed water. That is, the backwash solution passes through the bead stratum, then passes through the biostratum, and then exits the inlet. Preferably, the backwash process removes 50% or more by weight of the microorganisms and 50% or more by weight of the EPS. More preferably, the backwash process removes 90% or more by weight of the microorganisms and 90% or more by weight of the EPS. In a preferred embodiment, as the backwash solution moves through the biostratum, the resin beads tend to sink, while the microorganisms and the EPS tend to float, and removal of the microorganisms and of the EPS proceeds more efficiently when the resin beads have higher bead density.

Bead-treated water may be used for any purpose. It is expected that bead-treated water will have a reduced tendency to cause biofouling in any subsequent system where it is used. Bead-treated water may be used in systems containing, for example, pipes, cooling towers, heat exchangers, water-purification systems, and combinations thereof. Water purification systems include, for example, reverse osmosis, filtration of all types (including, for example, ultrafiltration, microfiltration, and nanofiltration), and combinations thereof. Preferably, the bead-treated water is conveyed to an apparatus that performs a reverse osmosis (RO) process, or a nanofiltration process (NF), or a combination thereof, on the bead-treated water. More preferably, the bead-treated water is conveyed to an apparatus that performs a reverse osmosis (RO) process on the bead-treated water. RO is a process in which pressure is used to drive pure or nearly pure water out of a sample of retentate (RB) by driving the water through a semipermeable membrane. In RO, the pure or nearly pure water that is driven through the semipermeable membrane is the permeate (PB), and the material left behind is the retentate (RB). The semipermeable membrane used in RO does not have permanent pores; the permeate diffuses through the semipermeable membrane material and is herein referred to as "RO-treated" water. RO is typically very effective at retaining nearly all solutes in the retentate, including monovalent ions. NF is a process in which water passes through a membrane having pore diameters of 1 to 10 nm. NF retains some multivalent ions while passing some monovalent ions.

Preferably, the bead-treated water produced by the method of the present invention will have a reduced tendency to cause biofouling on any downstream apparatus (such as, for example, an RO membrane or an NF membrane). While the present invention is not limited to any mechanism, the following describe possible mechanisms for accomplishing the benefits of the present invention. It is contemplated that microorganisms in the feed water will congregate in the biostratum and not be deposited on the downstream apparatus. It is further contemplated that growth of microorganisms in the biostratum will remove potential nutrients, such as phosphorous, from the feed water, thus depriving any microorganisms located on the downstream apparatus from obtaining nutrients needed for growth. Additionally, it is contemplated that the resin beads may remove phosphorous from the feed water, thus removing nutrient from the feed water, thus discouraging growth of microorganisms in downstream apparatus. It is contemplated that resins that contain hydrated ferric oxide will be especially effective at removal of phosphorous. The combination of the biostratum and a HFO-containing resin is considered to be especially effective, because it is contemplated that the biostratum will remove most of the phosphorous and most of the other assimilable nutrients, and then the HFO-containing resin in the bead stratum will remove the rest, thus effectively preventing growth of microorganisms in any downstream apparatus. Preferably, the HFO-containing resin removes sufficient phosphorous that the bead-treated water contains 0 to 8 parts per billion by weight (ppb) of phosphorous.

Another non-limiting contemplated mechanism of the present invention is the improved filtration effectiveness that arises in the biostratum. It is considered that, as the biostratum grows, the microorganisms and the EPS fill some of the void spaces between resin beads, thereby increasing the packing density. It is contemplated that as microorganisms continue to grow, the biostratum continues to grow, and the packing density continues to increase. As these voids become filled, the biostratum begins to block the passage of smaller and smaller particles, leading to more and more effective blocking of bacteria. Thus the biostratum both promotes its own growth and prevents downstream biofouling by trapping bacteria from the feed water in the biostratum.

The following are examples of the present invention.

Two different experimental set-ups were used, as follows.

Set Up 1 is illustrated in FIG. 2. In Set UP 1, the unit was as follows. The experiments were carried out in a flat cell testing bench manufactured by Prominent (Prominent Iberia S.A., Spain). The unit consisted of a centrifugal feed pump (LOWARA 2HM3/A) (not illustrated if FIG. 2) that send the water to a tank 21 (30 L). There, water temperature was controlled at 25° C. through a heater, and was sent in once-through mode to six lines in parallel. Three of these lines had 3 IX columns 24 (Llaberia Plastics, S.L.), and after each column a membrane fouling simulator 23 (RO) was present 1 (101129 003 1010, Global Membrains). The other three lines just had RO membrane fouling simulators 23, without any IX column before them. Feed flow was adjusted using individual needle valves (Brooks Instrument FC 8800) and the feed flow was measured using flowmeters (V038D 0-30 L/h, Stubbe type FIP FCF). The pressure drop was registered using a pressure drop transmitter (PMD75-ABA7LB12AAA-16-16 bar, Endress Hauser). The resin column 24 had cross-sectional area 19 cm$^2$, bed depth 4 to 40 cm, PVC-U transparent columns (Llaberia Plàstics, S.L.).

In Set Up 1, a nutrients stock solution 22 was dosed in order to enhance the biological fouling potential of feed water. This nutrients solution 22 was prepared in an external tank 22 using sodium acetate (CAS 127 09 3 VWR, USA), sodium nitrate (CAS 7631-99-4 Sigma-Aldrich, USA) and sodium dihydrogen orthophosphate dihydrate (CAS 7558-80-7 Sigma-Aldrich, USA) to achieve a C:N:P ratio of 100:20:10. Sodium hydroxide (VWR, USA) was used to adjust the tank solution to pH=12 to avoid contamination, before being injected to the feed water using a peristaltic pump (not illustrated in FIG. 2). Carbon (C) concentration in the feed water is adjusted to be 0.2 mg/L, nitrogen (N) 0.04 mg/L and phosphorous (P) 0.02 mg/L. The feed water temperature was adjusted to 25° C. and brackish water feed flow was set at 16 L/h. Sodium metabisulfite was injected (up to 5 mg/L) prior to use in the flat cell unit as an additional measure to ensure the chlorine concentration was always less than 0.02 mg/L.

In Set Up 1, additional conditions were as follows:
RO cells: 4 cm×20 cm, transparent methacrylate material (101129 003 1010, Global Membrains)
Temperature: Controlled at 25° C.
Pressure: 1.5 bar
Water type: Conventionally pre-treated river water ("Brackish Water"). The composition of the brackish water was as follows:

Composition of Brackish Water

| Characteristic | Average Concentration | Characteristic | Average Concentration |
|---|---|---|---|
| ATP (ng/l) | 15 | Lithium (µg/l) | 90 |
| Conductivity (µS/cm) | 745 | Magnesium (mg/l) | 15.5 |
| Total Iron (µg/l) | 40 | Nitrate-NO3 (mg/l) | 7.24 |
| pH | 7.6 | Phosphate-PO4 (µg/l) | 40 |
| TOC (mg/l) | 1.23 | Potassium (mg/l) | 2.45 |
| Alkalinity (mg/l HCO$_3^-$) | 174 | Sodium (mg/l) | 51.9 |
| Calcium (mg/l) | 97.8 | Sulfate-SO4 (mg/l) | 120 |
| Chloride (mg/l) | 71.8 | Total Dissolved Ions (mg/l) | 550 |

Set Up 2 is illustrated in FIG. 3. The unit was as follows. The experiments were carried out using 4 different RO membrane fouling simulators skids 23 (101129 003 1010, Global Membrains) connected in parallel. Two of these skids had 2 upstream IX columns 24 (Llaberia Plastics, S.L.) (one IX column for each skid), used as a pretreatment to the RO. Feed pressure was obtained from the booster pumps (not illustrated in FIG. 3) of an existing RO pilot. Feed flow was adjusted using individual needle valves (Brooks Instrument FC 8800) and the feed flow was measured using flowmeters (V038D 0-30 L/h, Stubbe type FIP FCF). The pressure drop was registered using a pressure drop transmitter (PMD75-ABA7LB12AAA-16-16 bar, Endress Hauser).

Characteristics of Set Up 2 were as follows.
Resin column: Cross-sectional area 19 cm$^2$, bed depth 4 to 40 cm, PVC-U transparent columns (Llaberia Plastics, S.L.)
RO cells: 4 cm×20 cm, transparent methacrylate material (101129 003 1010, Global Membrains)
Temperature: 14-20° C.
Pressure: 3 bar
Water type: Ultrafiltrated (Dow Ultrafiltration) secondary clarified wastewater effluent.
Composition of the wastewater was as follows:
Wastewater

| Characteristic | Average concentration | Characteristic | Average concentration |
|---|---|---|---|
| ATP (ng/l) | 100 | Calcium (mg/l) | 142 |
| BOD5 (mg/l O2) | 2.1 | Chloride (mg/l) | 415 |
| Color (Pt-Co) | 36 | Magnesium (mg/l) | 44 |
| Conductivity (µS/cm) | 2,290 | Nitrate-NO3 (mg/l) | 3.5 |
| Aluminum (µg/l) | 50 | Nitrite-NO2 (mg/l) | 8.0 |
| Total Iron (µg/l) | 70 | Phosphate-PO4 (mg/l) | 0.42 |
| pH | 7.66 | Potassium (mg/l) | 17 |
| TOC (mg/l) | 6.9 | Sodium (mg/l) | 247 |
| Total COD (mg/l O$_2$) | 22 | Sulfate-SO4 (mg/l) | 220 |
| Alkalinity (mg/l HCO$_3^-$) | 405 | Total Dissolved Ions (mg/l) | 1,545 |
| Ammonium —NH$_4^+$ (mg/l) | 24 | | |

Various experiments were performed using a variety of resins and conditions. The conditions were as follows:

Characteristics of Experiments

| Example | ANFVV[1] | PD[2] | RSV[3] | FR[4] | Re[5] |
|---|---|---|---|---|---|
| Example 1 | 0.00360 | 0.64 | 21.33 | 500 | 0.33 |
| Example 2 | 0.01440 | 0.64 | 21.33 | 125 | 0.33 |
| Comparative 1 | 0.00300 | 0.94 | 188.00 | 100 | 1.99 |
| Comparative 2 | 0.00360 | 0.64 | 21.33 | 1500 | 1.00 |
| Comparative 3 | 0.21600 | 0.46 | 10.22 | 12.5 | 0.22 |
| Comparative 4 | 0.00360 | 0.64 | 21.33 | 1500 | 1.00 |
| Comparative 5 | 0.60000 | 0.00 | 0.00 | 8.33 | 0.12 |
| Comparative 6 | 0.00300 | 0.64 | 23.70 | 500 | 0.30 |

[1] area-normalized free void volume ($m^3/m^2$)
[2] packing density
[3] ratio of exterior surface area of the resin beads to the total free void volume ($m^2/L$)
[4] flow rate (biostratum volumes per hour)
[5] Reynolds number Various resins were tested, having the following characteristics:

Fe: either impregnated with iron (HFO, as defined above) or no type: resins were either acrylic or styrenic. Acrylic resins have 75% or more by weight polymerized units of acrylic monomers. Styrenic resins have 90% or more by weight polymerized units of vinyl aromatic monomers.

functional groups: each resin had pendant functional groups selected from the following.

none

WB=weak base=functional group is a primary, secondary, or tertiary amine

SB=strong base=functional group is a quaternary ammonium group

SA=strong acid=functional group is sulfonic acid or sulfonate

Also tested was granular activated carbon (GAC)

Characteristics of the experiments were as follows:

ADDITIONAL CHARACTERISTICS OF EXPERIMENTS EXAMPLE 1

| Experiment | Example | Set Up | Flow | Bed height | Fe? | Type | Function |
|---|---|---|---|---|---|---|---|
| 1 | Example 1 | 1 | 16 L/h | 40 cm | yes | acrylic | WB |
| 2 | | | | | no | styrenic | SA |
| 3 | | | | | no | styrenic | SB |
| 4 | | | | | no | styrenic | none |
| 5 | | | | | no | acrylic | none |
| 6 | | | 16 L/h | 4 cm | yes | acrylic | WB |
| 7 | | | | | no | acrylic | none |
| 8 | | | 30 L/h | 40 cm | yes | acrylic | WB |
| 9 | | | | | yes | styrenic | SB |
| 10 | | 2 | 16 L/h | 40 cm | yes | acrylic | WB |
| 11 | | | | | no | acrylic | none |

ADDITIONAL CHARACTERISTICS OF EXPERIMENTS EXAMPLE 2 AND COMPARATIVE 1

| Experiment | Example | Set Up | Flow | Bed height | Fe? | Type | Function |
|---|---|---|---|---|---|---|---|
| 12 | Example 2 | 1 | 16 L/h | 40 cm | yes | acrylic | WB |
| 13 | | | | | no | styrenic | SA |
| 14 | | | | | no | styrenic | SB |
| 15 | | | | | no | styrenic | none |
| 16 | | | | | no | acrylic | none |
| 17 | | | 16 L/h | 4 cm | yes | acrylic | WB |
| 18 | | | | | no | acrylic | none |
| 19 | | | 30 L/h | 40 cm | yes | acrylic | WB |
| 20 | | | | | yes | styrenic | SB |
| 21 | | 2 | 16 L/h | 40 cm | yes | acrylic | WB |
| 22 | | | | | no | acrylic | none |
| 23 | Comparative 1 | 1 | 16 L/h | 40 cm | yes | acrylic | WB |
| 24 | | | | | no | styrenic | SA |
| 25 | | | | | no | styrenic | SB |
| 26 | | | | | no | acrylic | none |

ADDITIONAL CHARACTERISTICS OF EXPERIMENTS COMPARATIVES 2-6

| Experiment | Example | Set Up | Flow | Bed height | Fe? | Type | Function | GAC? |
|---|---|---|---|---|---|---|---|---|
| 27 | Comparative 2 | 1 | 16 L/h | 4 cm | yes | acrylic | WB | no |
| 28 | | | | | no | acrylic | none | no |
| 29 | | | 30 L/h | 40 cm | yes | acrylic | WB | no |
| 30 | | | | | yes | styrenic | SB | no |
| 31 | | | 16 L/h | 40 cm | yes | acrylic | WB | no |
| 32 | | | | | no | acrylic | none | no |
| 33 | Comparative 3 | 1 | 30 L/h | 40 cm | | | | yes |
| 34 | | | | | yes | acrylic | WB | no |
| 35 | | | | | no | acrylic | none | no |
| 36 | Comparative 4 | 1 | 30 L/h | 4 cm | yes | acrylic | WB | no |
| 37 | | | | | yes | styrenic | SB | no |
| 38 | | | | | no | acrylic | none | no |
| 39 | Comparative 5 | 1 | 16 L/h | 40 cm | yes | acrylic | WB | no |
| 40 | | | | | no | acrylic | none | no |
| 41 | Comparative 6 | 1 | 16 L/h | 40 cm | no | styrenic | none | no |

Each experiment was operated for a period of time. In the Example experiments, a biostratum was clearly visible. Then the vessel containing the resin beads was backwashed by feeding water through the column in the opposite direction from the direction that the feed water had followed.

Observations were as follows:

| Experiments | Examples | Observations |
|---|---|---|
| 1-22 | Examples 1 and 2 | The column operated normally. Downstream RO membrane did not show biofouling. Backwashing the column appeared to remove the microorganisms, and subsequent runs had similar pressure drop to previous runs. |
| 23-32 | Comparatives 1 and 2 | Pressure drop in the column was too high, and therefore the system could not be operated properly. |
| 33-40 | Comparatives 3, 4, and 5 | Biofouling developed relatively quickly in downstream RO apparatus. |
| 41 | Comparative 6 | Backwashing appeared to be ineffective at removing microorganisms from the biostratum. After each backwash, pressure drop was higher than in previous runs. Eventually the entire column became clogged with microorganisms. |

Additional backwashing experiments were performed as follows. Three resins that met the criteria for the present invention, Inventive 3, Inventive 4, and Inventive 5, were each used in a method of the present invention involving Set-Up 1, as described above. After the method of the present invention was conducted for a time, in each case a biostratum formed. Then the process was stopped, and a backwash was performed by a method that included forcing water through the outlet, through the column, and out the inlet. "Efficient" backwashing means that the microorganisms and the EPS were removed comparatively quickly by the backwash process. "Inefficient" backwashing means that the microorganisms and the EPS were removed comparatively slowly by the backwash process. Results were as follows:

Backwashing Results

| Resin | Bead Density | Backwash |
|---|---|---|
| Inventive 3 | 1.08 | inefficient |
| Inventive 4 | 1.28 | efficient |
| Inventive 5 | 1.20 | efficient |

All three resins operated the method of the present invention properly. Inventive 4 and Inventive 5, the resins with relatively high bead density, showed more efficient backwashing that Inventive 3, the resin with lower bead density.

The invention claimed is:

1. A method of treating feed water comprising the step of passing the feed water through a biostratum that comprises resin beads and living microorganisms to produce biostratum-treated water, wherein (a) the area-normalized free void volume (ANFVV) in the biostratum is 0.018 $m^3/m^2$ or less, wherein ANFVV is total free void volume divided by the area of the cross section of the biostratum; (b) the packing density in the biostratum is 0.68 to 0.98; (c) the ratio of the exterior surface area of the resin beads to the total free void volume in the biostratum is 2.0 to 50 $m^2/L$; (d) the flow rate of feed water through the biostratum is 100 to 1,000 biostratum volumes per hour; and (e) the Reynolds number of the flow through the biostratum is 0.10 to 3.0; and further comprising passing the biostratum-treated water through an apparatus that performs a reverse osmosis process.

2. The method of claim 1, wherein the biostratum is located in a vessel, wherein the vessel also contains a bead stratum, wherein the bead stratum comprises a collection of resin beads, wherein the bead stratum does not comprise microorganisms, and wherein the biostratum-treated water passes through the bead stratum to produce bead-treated water.

3. The method of claim 2, wherein the biostratum has a length L, wherein the bead stratum has a length LB, and wherein the ratio LB:L is 2:1 or greater.

4. The method of claim 2, wherein the feed water enters the vessel through an inlet, and the bead-treated water leaves the vessel through an outlet, and wherein the method further comprises the subsequent step of backwashing, which comprises forcing an aqueous backwash solution into the vessel through the outlet, so that the water passes through the bead stratum, passes through the biostratum, and leaves the vessel through the inlet.

5. The method of claim 1, wherein the Reynolds number is 0.30 to 1.10.

\* \* \* \* \*